T. ST. J. B. PARNALL AND F. G. MITCHELL.
TRANSPORTER WEIGHING CRANE.
APPLICATION FILED MAR. 22, 1917.
1,310,540.
Patented July 22, 1919.
2 SHEETS—SHEET 1.
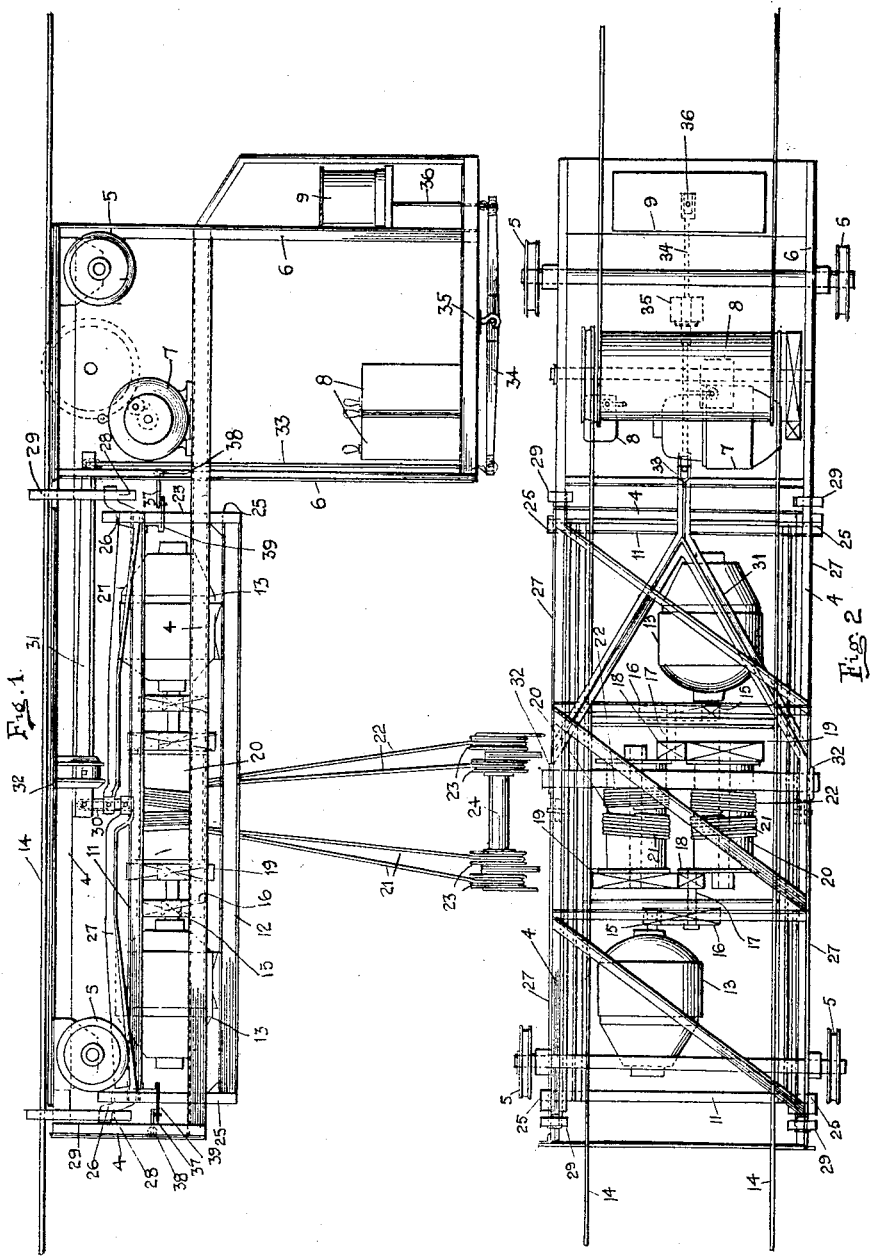
Inventors
Thomas St. Julian B. Parnall and
Frederick Gilbert Mitchell
by Laurence Languer
Attorney

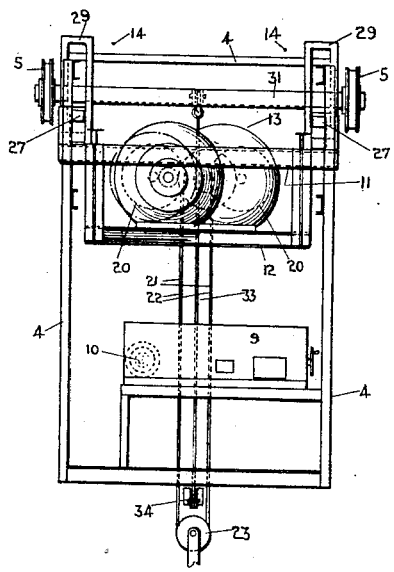

UNITED STATES PATENT OFFICE.

THOMAS ST. J. B. PARNALL, OF SMETHWICK, NEAR BIRMINGHAM, AND FREDERICK G. MITCHELL, OF HYDE PARK, LONDON, ENGLAND.

TRANSPORTER WEIGHING-CRANE.

1,310,540.   Specification of Letters Patent.   Patented July 22, 1919.

Application filed March 22, 1917. Serial No. 284,489.

*To all whom it may concern:*

Be it known that we, THOMAS ST. JULIAN BABINGTON PARNALL and FREDERICK GILBERT MITCHELL, subjects of the King of Great Britain, residents, respectively, of Soho Foundry, Smethwick, near Birmingham, in the county of Stafford, England, and of 22 Gloucester Terrace, Hyde Park, London, W. 2, England, have invented a new and useful Improvement in Transporter Weighing-Cranes; and we do hereby declare the following to be a full, clear, and exact description of the same.

This invention has reference to improvements in transporter weighing cranes and has for its object to combine an automatic weighing apparatus with the traveling trolley of a transporter crane whereby an efficient apparatus for the combined functions of transportation and weighment of material can be embodied in a crane without adversely affecting the ordinary operations of either apparatus and effecting an economy in both time and labor.

Our invention comprises a transporter weighing crane wherein the traveling trolley is formed in two sections (which we will hereinafter term a fixed section and a free section) the fixed section comprising a framework supported upon wheels supported upon the transporter track and the free section being suspended by means of interposed levers and linkage from said fixed section. Mounted upon the free section are the electric motors and other mechanism connected with the grab operating gear, said motors having flexible control connections to the grab operating housing which is mounted upon the fixed section, and said interposed levers and linkage being in turn connected to an automatic weighing apparatus having its indicating or recording mechanism also located in the grab operating housing, whereby the grab operating mechanism and the weighing apparatus are under the immediate control and observation of one operator stationed in the said housing.

This invention will now be described in conjunction with the accompanying drawings which illustrate one means of carrying the invention into practice; similar reference numerals indicate similar parts in the several views.

Figure 1 is a side elevation of so much of a transporter weighing crane as is necessary to an understanding of this invention.

Fig. 2 is a plan of Fig. 1.

Fig. 3 is an end elevation of Fig. 1 viewed from the right hand side.

The transporter trolley consists of what we will term a fixed section which in this construction is an outer framework 4 formed of channel or other suitable section of iron or steel mounted by means of four wheels 5 upon the transporter track (not shown) along which the said fixed section is adapted to be traversed by means of the ropes 14, said section having at its right hand end a grab operating housing 6 formed integral with the framework of the said section, the said housing 6 containing the motors 7 and control mechanism 8 for traversing the trolley along the transporter track, the said housing also containing the indicating or recording mechanism 9 of an automatic weighing apparatus, said weighing apparatus preferably being of the type referred to in the prior specifications of British Letters Patents Nos. 4935 of 1905, 13544 of 1906, 15690 of 1909 and 103707, and being operated by means of an electric motor 10 located in the said housing. Positioned within the said outer fixed section 4 of the trolley is a free section 11 also constructed as a framework of channel or other suitable section of iron or steel. Upon the base 12 of this inner or free section 11 are mounted the electric motors 13 which have dynamic braking means connected therewith, said motors controlling the grab operating gear.

The grab operating gear comprises the small pinions 15 mounted on the shafts of the motors 13, the pinions 15 meshing with the tooth wheels 16 mounted on the shafts 17 on which are also mounted the pinions 18 which in turn mesh with the tooth wheels 19 secured to the two winding drums 20 around which are oppositely wound the ropes 21 and 22. These ropes pass around the idle pulleys 23 mounted on the spindle 24 from which the grab (not shown) is suspended. The spindle 24 is located midway between and beneath the winding drums 20 and by this means of suspension of the grab the twisting and swinging motion thereof is reduced as during the descent of the grab the rope suspensions 21 and 22 uncoil off the drums 20 and the four points of suspension of the grab from the said drums move farther apart to stabilize the support to check any tendency to a twisting or swinging motion of the grab.

The inner or free section 11 of the trolley is mounted by means of the four corner supports 25 upon knife edges 26 of four weighing levers 27 which are fulcrumed by means of knife edges 28 at their outer ends upon link bearings 29 suspended from the fixed outer section 4 of the trolley, said weighing levers 27 being superposed at their inner ends and connected by links 30 to the forked end of shaped lever 31, said lever 31 being fulcrumed on the bearing bracket 32 secured to the fixed section 4 and connected at its other end to a connecting rod 33 which in turn is connected to an intermediate lever 34 fulcrumed on the lower frame of the grab housing 6 by means of a bearing bracket 35, said lever 34 being connected by means of a rod 36 to the indicating or recording mechanism 9 of the automatic weighing apparatus located in the grab housing 6. The connections between the grab operating motors 13 located on the free section 11 of the trolley and the switches or other controls 8 in the grab housing 6 of the fixed section 4 of the trolley are flexible wires (not shown) and the connection between the weighing levers upon which the free section 11 is suspended, and the indicating or recording mechanism 9 in the said grab housing 6 is a rod 33 having knife edge connection at its upper and lower ends so as to permit of a free swinging motion of the rod 33, and thereby no inaccuracy of weighment obtains irrespective of the position of the grab or of the trolley upon the transporter.

To prevent excessive lateral swinging motion of the free section 11 of the trolley knife edge stays 37 are introduced between the sides of the fixed section 11 and the four corner supports 25 forming part of the free section 11, the said stays 37 being pivoted at 38 to the fixed section and the other ends of the stays being loosely located within a slot formed in the plates 39 which are secured to the corner supports 25.

The means of traversing the transporter form no part of the present invention and will therefore not require description in this specification.

Claims:

1. A transporter weighing crane embodying a traveling trolley formed in two sections, a fixed section and a free section; said fixed section being supported upon wheels adapted to be mounted upon a transporter track, weighing levers and linkage interposed between said fixed and said free sections, said free section being suspended by means of said interposed weighing levers and linkage from said fixed section, grab operating gear mounted on said free section, electric motors and other mechanism connected with the grab operating gear, carried by said free section, flexible control connection for said motors extending from said motors to grab operating housing, said housing being mounted upon the fixed section, an automatic weighing apparatus having its indicating or recording mechanism located in the grab operating housing, said interposed levers and linkage being in turn connected to said automatic indicating or recording mechanism.

2. A transporter weighing crane embodying a traveling trolley formed in two sections, a fixed section and a free section; said fixed section being supported upon wheels adapted to be mounted upon a transporter track, weighing levers and linkage interposed between said fixed and said free sections, said free section being suspended by means of said interposed weighing levers and linkage from said fixed section, grab operating gear mounted on said free section, electric motors and other mechanism connected with the grab operating gear carried by said free section, flexible control connection for said motors extending from said motors to the grab operating housing, said housing being mounted upon the fixed section, an automatic weighing apparatus having its indicating or recording mechanism located in the grab operating housing, said interposed levers and linkage being in turn connected to said automatic indicating or recording mechanism, and grab supporting means comprising four flexible connections oppositely wound upon two winding drums geared to the operating motor.

3. A transporter weighing crane embodying a traveling trolley formed in two sections, a fixed section and a free section; said fixed section being supported upon wheels adapted to be mounted upon a transporter track, weighing levers and linkage interposed between said fixed and said free sections, said free section being suspended by means of said interposed weighing levers and linkage from said fixed section, grab operating gear mounted on said free section, electric motors and other mechanism connected with the grab operating gear carried by said free section, flexible control connection for said motors extending from said motors to the grab operating housing, said housing being mounted upon the fixed section, automatic weighing apparatus having its indicating or recording mechanism located in the grab operating housing, said interposed levers and linkage being in turn connected to said automatic indicating or recording mechanism, and knife edge stays connecting the said fixed section and the free section to prevent lateral swinging motion of the free section relative to the fixed section.

4. A transporter weighing crane comprising a fixed section mounted upon wheels adapted to be mounted on a transporter track, a free section mounted upon weighing levers fulcrumed on said fixed section, electric motors and grab operating gear mounted on said free section, a grab operating housing mounted on said fixed section, a weight indicating or recording mechanism located in said housing and flexible connections between the mechanism carried by the fixed section and the free section.

In testimony whereof, we have signed our names to this specification in the presence of two subscribing witnesses.

T. ST. J. B. PARNALL.
F. G. MITCHELL.

Witnesses:
 GEORGE E. FOLKES,
 ORLANDO J. WORTH.

Copies of this patent may be obtained for five cents each, by addressing the "Commissioner of Patents, Washington, D. C."

It is hereby certified that in Letters Patent No. 1,310,540, granted July 22, 1919, upon the application of Thomas St. J. B. Parnall, of Smethwick, near Birmingham, and Frederick G. Mitchell, of Hyde Park, London, England, for an improvement in "Transporter Weighing-Cranes," an error appears requiring correction as follows: In the headings to the specification and the two sheets of drawings, date of filing application, for "March 22, 1917" read *March 22, 1919;* and that the said Letters Patent should be read with this correction therein that the same may conform to the record of the case in the Patent Office.

Signed and sealed this 2d day of December, A. D., 1919.

[SEAL.]
M. H. COULSTON,
*Acting Commissioner of Patents.*

Cl. 265—5.